United States Patent [19]

Kangas et al.

[11] 4,240,826
[45] Dec. 23, 1980

[54] PROCESS FOR THE RECOVERY OF ARSENIC AS A ZINC ARSENATE AND ITS UTILIZATION IN THE PURIFICATION OF ZINC PLANT ELECTROLYTES

[75] Inventors: Kayo Kangas, Connaught; John Mouland; Stan Timler, both of Timmins, all of Canada

[73] Assignee: Texasgulf Inc., Stamford, Conn.

[21] Appl. No.: 75,081

[22] Filed: Sep. 13, 1979

[51] Int. Cl.$^3$ .......................... C22B 3/00; C25C 1/14
[52] U.S. Cl. ........................................ 75/109; 75/120; 204/119
[58] Field of Search ...................... 75/101 R, 109, 119, 75/99, 120; 204/119

[56] References Cited

U.S. PATENT DOCUMENTS

| | | | |
|---|---|---|---|
| 1,322,104 | 11/1919 | Gepp et al. | 204/119 |
| 4,049,514 | 9/1977 | Freeman et al. | 204/119 |
| 4,168,970 | 9/1979 | Ghatas | 75/109 |

Primary Examiner—Donald L. Walton
Attorney, Agent, or Firm—Denis A. Polyn

[57] ABSTRACT

The invention described herein relates to metallurgical processes for the recovery of zinc arsenate from cement copper cake residues, and the use thereof in the purification of impure zinc electrolyte.

52 Claims, 3 Drawing Figures

Curve 1 Retention Time ½ Hr.
Curve 2 Retention Time 1 Hr.

PROCESS FOR THE RECOVERY OF ARSENIC AS A ZINC ARSENATE AND ITS UTILIZATION IN THE PURIFICATION OF ZINC PLANT ELECTROLYTES

BRIEF DESCRIPTION AND BACKGROUND OF THE INVENTION

Zinc is the twenty-fourth most abundant element in the earth's crust and finds many industrial applications, the most important being the oxidation-resistant treatment of iron surfaces, and others being in various fields, including topical medicines, chemical reagents, etc.

Zinc is not found in the metallic state in nature. Its chief ore is zinc blend or sphalerite (ZnS) which is the source of ninety percent of the zinc produced today. The zinc production methods employed today necessitate high treatment costs and consequently zinc metal producers demand high-grade concentrates.

There are two main methods of zinc recovery from its ores, i.e., thermal reduction and electrolytic deposition, the latter requiring the availability of relatively inexpensive electrical power in view of the fact that the production of one ton of zinc requires approximately 4500 kilowatt-hours. The purest zinc (99.99%) is achieved by the electrolytic methods.

The current world production of zinc is about 3,800,000 metric tons per year, 47% by electrolytic methods and the balance by thermal methods.

The thermal methods involve the following general reactions:

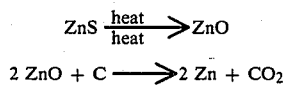

The electrolytic methods generally involve the following reactions:

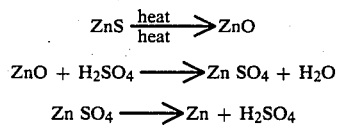

Electrolytic zinc plants utilize four operations: (1) roasting of zinc sulfide concentrate; (2) leaching of the roasted concentrate or calcine to extract the soluble zinc; (3) purification of the resulting solution; and (4) electrolysis of the solution to obtain metallic zinc.

Zinc impure electrolyte typically contains impurities of copper, cobalt, nickel and cadmium that are detrimental to the plating of zinc and must be removed—or at least reduced to an acceptably low concentration—prior to electrolysis. In past practice, the cobalt class of impurities were removed by a hot copper sulfate/arsenic trioxide/zinc dust first stage impure electrolytic purification.

The precise mechanism of the hot copper sulfate/arsenic trioxide/zinc dust purification technique is not thoroughly understood. However, a plausible explanation is as follows: zinc dust displaces copper and nickel from solution, and it is believed that the arsenic and copper are precipitated as a metallic couple. Zinc dust ordinarily does not displace cobalt and nickel from solution, but in the presence of the copper-arsenic couple, these metals are quantitatively precipitated. The copper sulfate and arsenic trioxide are added to the impure electrolyte to provide the metallic couple, however if the copper content of the electrolyte is sufficiently high, copper sulfate need not be added.

The by-product of the purification procedure is a cement copper cake residue containing, in addition to copper, varying amounts of zinc, cadmium, cobalt, nickel and arsenic. The market value of the cake is primarily dependent on the percentage of copper contained therein.

There are several disadvantages to the above described purification procedure.

(1) The process requires the addition of arsenic trioxide and possibly copper sulfate, which affects the economics of the overall process.

(2) The cement copper cake residue, because of its arsenic content, has a greatly reduced market value.

(3) The zinc, cadmium and cobalt values in the cement copper cake are not reflected in the market value of the latter and consequently reflect losses in the overall process economics.

U.S. Pat. No. 4,049,514 discloses a process that relates to the electrolytic production of zinc metal and involves the treatment of the cement copper cake to provide a treated cement copper cake upgraded in its copper content, and a copper arsenate product which is employed in the purification of the impure electrolyte. The copper arsenate is employed in the electrolyte purification process as a substitute for the more conventional copper sulfate and arsenic trioxide reagents discussed above.

Upgrading of cement copper cake and recovery of arsenic is accomplished in the process disclosed by the cited patent in four basic operations: (1) acid leaching; (2) cobalt removal; (3) caustic leach; and (4) arsenic removal. The acid leach is conducted under optimum conditions for the dissolution of zinc, cadmium and cobalt while at the same time suppressing copper extraction. The solution and residue of the acid leach are separated by filtration for further processing. In order to make a zinc/cadmium solution suitable for recycling to the zinc plant, cobalt is removed from the acid leach solution. The copper and arsenic containing residue from the acid leach is subjected to a caustic leach to dissolve the arsenic. The caustic leach slurry is then filtered. This leaves a residue containing 60 to 70 percent copper and less than 1 percent arsenic providing an improved marketable product having an increased copper content.

In accordance with this invention, an improved process is provided for the treatment of impure zinc electrolyte wherein the cement copper cake produced by the impure electrolyte purification step, is treated by an acid leach and then caustic leach, to provide a cement copper cake residue upgraded in copper content, as well as an arsenic containing caustic leach filtrate. Zinc arsenate is precipitated from the arsenic containing caustic leach filtrate with zinc containing spent electrolyte or zinc neutral. The zinc arsenate precipitate is employed in the purification of impure zinc electrolyte as a substitute for copper arsenate, or the copper sulfate arsenic trioxide reagents employed by known zinc electrolyte purification processes. The zinc arsenate filtrate is employed in the precipitation of jarosite residue as a substitute for sodium carbonate and copper arsenate filtrate.

Significantly, the use of zinc arsenate during the electrolyte purification step reduces the necessity of purchasing reagents from outside sources and, therefore reduces the cost of the over-all zinc electrolyte purification process. More specifically conventional zinc electrolyte purification processes employ copper sulfate and arsenic trioxide reagents which must be purchased from outside sources which increases the cost of the purification process. Although, as will be discussed below, a minor amount of arsenic trioxide may, in some instances, be required during the electrolyte purification step of this invention, the amount of arsenic trioxide employed is either totally eliminated or greatly reduced relative to conventional purification processes, and the purchase of copper sulfate is not required. Moreover, although U.S. Pat. No. 4,049,514 discloses a process employing copper arsenate precipitated from caustic leach filtrate, the copper employed to precipitate the copper arsenate is copper sulfate—a reagent which also must be purchased from outside sources. By way of contrast, this invention provides a more economic and efficient process for the purification of impure zinc electrolyte wherein the zinc arsenate is precipitated from the caustic leach filtrate employing zinc neutral or spent zinc electrolyte which are available purification plants as internal products of the zinc electrolysis process and, hence, the purchase of copper sulfate required by the process disclosed by U.S. Pat. No. 4,049,514 is not required.

The process of this invention comprises the step of: (1) electrolyte purification employing zinc arsenate obtained from the caustic leach filtrate. This step results in the formation of the cement copper cake which contains primarily copper, zinc, cadmium, cobalt, nickel and arsenic (2) acid leaching of the cement cake to provide a residue, enriched in copper and containing arsenic, and a filtrate containing zinc, cadmium and cobalt impurities; (3) removal of cobalt from the acid leach filtrate to provide a zinc containing solution suitable for electrolysis; (4) caustic leach of the acid leach residue to provide a residue rich in copper and an arsenic containing filtrate, (5) treatment of the arsenic containing filtrate from the caustic leach step to provide zinc arsenate. The zinc arsenate is then employed with zinc dust in the electrolytic purification step.

The invention will be described below with reference to each of the steps outlined above, and with reference to the figures wherein.

DETAILED DESCRIPTION OF THE INVENTION

Figure 1:
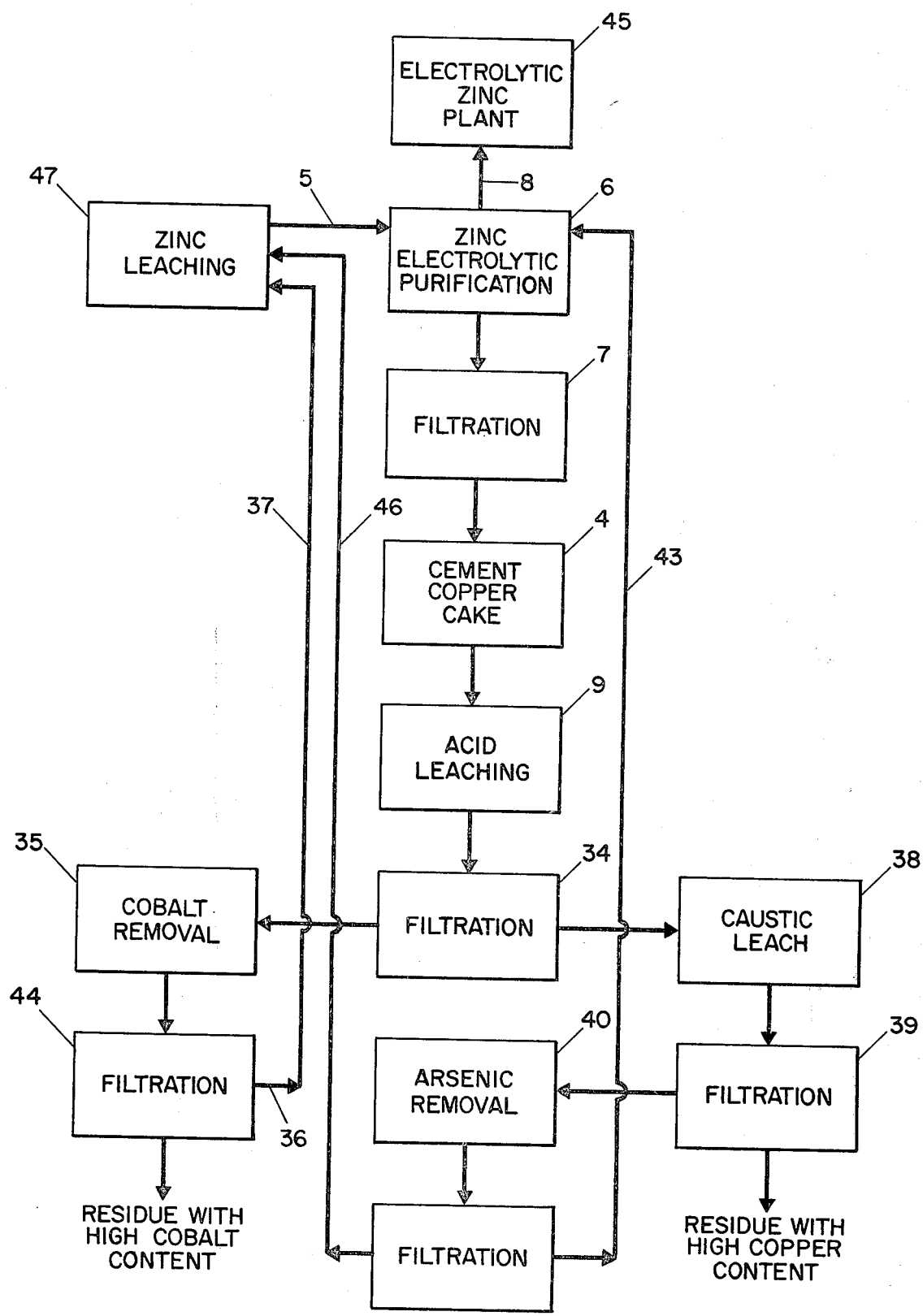
FIG. 1 is a schematic flowchart of the process treatment steps of the invention.

With reference to FIG. 1, the process of the invention is set forth in schematic form. Not shown in FIG. 1 is the preliminary processing of zinc ore which is conventional. In accordance with known procedures, zinc sulfate ore is roasted to form zinc oxide, and then leached with sulphuric acid to form zinc sulfate solution referred to herein as impure zinc electrolyte. Impure zinc electrolyte includes impurities which must be removed because they are detrimental to the plating of zinc. Impure zinc electrolyte typically contains about 0.5 to 1.0 grams per liter copper, 20–30 ppm of cobalt, 1–2 ppm nickel and may in addition contain cadmium.

With reference to FIG. 1, the impure feed solution 5 is fed to the zinc electrolyte purification section 6 where it is treated in accordance with the present invention with zinc dust and zinc arsenate as described in more detail below, in order to precipitate the cobalt class of contaminating impurities using the cobalt level in the solution as a control. The final cobalt level must be less than 0.1 parts per million in order to ensure sufficient purity of the electrolyte for the electrolysis step.

The residue from the purification step 6 is separated by any conventional means such as filtration at 7 and constitutes what is known as cement copper cake 4 which typically contains the following components:

| | |
|---|---|
| 43.4% | copper |
| 6.64% | zinc |
| 1.89% | cadmium |
| 1.25% | cobalt |
| 0.05% | nickel |
| 6.89% | arsenic |

This filtrate is further purified to remove cadmium from the electrolyte by addition of zinc dust and copper sulphate in what is classified as second stage of purification. This residue being delivered for further treatment is known as second stage purification residue.

The purified zinc electrolyte filtrate is delivered through line 8 to the electrolytic zinc plant 45 for electrolysis. The cement copper cake 4 is treated in order to (a) upgrade the copper content and purity of the residue to increase the market value thereof and (b) to recover the arsenic content and convert the latter to zinc arsenate and recycle the zinc arsenate to the purification step 6 and use it in conjunction with zinc dust for the previously described precipitation step in place of the prior art copper sulfate/arsenic trioxide reagents.

The cement copper cake 4 is subjected to an acid leaching step 9 in order to recover zinc, cadmium and cobalt constituents therefrom as a filtrate and to provide a residue separated by filters 34. The filtrate is delivered to the cobalt removal stage 35 to separate the cobalt therefrom so that the resulting zinc/cadmium solution can be delivered through line 36 to recycle line 37 through which it is delivered to the leaching plant 47 for recovery of zinc and cadmium. The residue from cobalt removal stage 35 has a high cobalt content and has market value.

The residue from filtration step 34 is subjected to a caustic leach 38 to dissolve the arsenic and leave a high copper residue which is separated in filtration step 39. The latter residue, designated as the treated cement copper cake, has an enhanced copper content which increases its market value. The filtrate from step 39 is treated with spent electrolyte or zinc neutral in arsenic removal stage 40 to provide zinc arsenate which may be recycled through return line 43 to the electrolytic purification step previously described. The remaining zinc and sodium containing solution is delivered via 46 to the zinc leach plant 47 for use in the leaching jarosite circuit.

THE ACID LEACH STEP

In accordance with the acid leach step, the cement copper cake is slurried in 20–30 GPL sulphuric acid, wherein about 100 to 200 grams of cement copper is added to the slurry per liter of solution. The temperature is adjusted to about 95° C. After about two hours, the acid leach slurry is neutralized to pH 3.5 to 4.0 with sodium hydroxide to precipitate any leached copper. The quantity of sodium hydroxide used in this step varies with different copper cake samples, as does the final pH. However, control is easily maintained by observing the color of the leach solution. Copper precipitation is complete when the solution loses its blue color. Consumption of sodium hydroxide is generally 75 to 150 pounds per dry ton of copper cake. Fresh copper cake consumes more sodium hydroxide than stockpiled copper cake. It should be noted that some degree of attritioning to break up lumps is necessary either before or during the acid leaching of stockpiled copper cake. Attrition is not needed for fresh cake.

The acid leach slurry is filtered at 34 and the arsenic rich residue displacement washed. The residue is black and finely divided. It is amenable to filtration by filter press and behaves similarly to regular copper cake.

Typical products of the acid leach, based on an average sample of copper cake assaying 6.24% Zn, 1.89% Cd, 1.25% Co, 0.71% Mn, 43.4% Cu, 6.89% As, 0.10% Na, and 15.5% $SO_4$, have the following analysis:

TABLE I

Results of Acid Leach Extractions
Stockpiled Cake

| Component | Filtrate (grams/liter) | Residue % | Recovery (as % metal value in feed) |
|---|---|---|---|
| Cd | 3.95 | 0.46 | 81.9 |
| Co | 2.77 | 0.22 | 87.0 |
| Mn | 1.71 | 0.05 | 94.3 |
| Cu | 0.22 | 57.8 | 0.20 |
| As | 1.99 | 8.14 | 11.4 |
| Na | 6.52 | 0.13 | 96.4 |
| $SO_4$ | 42.2 | 6.81 | 76.4 |

Fresh Cake

| Component | Filtrate (grams/liter) | Residue % | Recovery (as % metal value in feed*) |
|---|---|---|---|
| Zn | 13.6 | 1.21 | 85.5 |
| Cd | 3.27 | 0.84 | 67.9 |
| Co | 1.87 | 0.70 | 58.8 |
| Mn | 1.76 | 0.03 | 97.0 |
| Cu | 55 ppm | 57.9 | 0.05 |
| As | 1.68 | 8.30 | 9.62 |
| Na | 11.5 | 0.32 | 94.5 |
| $SO_4$ | N/A | N/A | N/A |

*Copper cake plus added reagents.
N/A = not analyzed.

COBALT REMOVAL

Cobalt removal is carried out at 35 under the following conditions. Filtrate from the acid leach process stage 9 is heated to about 95° C. and solid potassium permanganate is added until a slight excess of permanganate is noted, as seen by a deep purple color. Sodium hydroxide is then added in an amount sufficient to maintain the pH of the resulting slurry at about 3.0 to 3.5. These conditions are maintained for about two hours. Total cobalt removal may be accomplished by using a longer reaction time but longer reaction times are not mandatory in this process. The slurry is filtered at 44 and the residue displacement washed.

Average reagent consumption per pound of cobalt removed is 3.8 pounds of potassium permanganate and 2.0 pounds of sodium hydroxide. These figures constitute a considerable excess over the theoretical requirement. The reason for this is that potassium permanganate is consumed in oxidizing manganese and arsenic in addition to cobalt in the acid leach solution.

Typical products of the cobalt removal stage obtained from a typical acid leach solution analyze as shown below in Table II. The filtrate is returnable to the zinc plant for recovery of zinc and cadmium. The amount of zinc and cadmium reporting to the cobalt rich residue requires a thorough displacement wash to remove zinc and cadmium.

TABLE II

Results of Cobalt Removal

| Component | Filtrate (grams/liter) | Residue % | Recovery (as % metal value in feed*) |
|---|---|---|---|
| Zn | 11.0 | 2.45 | 5 |
| Cd | 3.48 | 1.64 | 10 |
| Co | less than 5 ppm | 11.5 | 100 |
| Mn | less than 5 ppm | 22.4 | 100 |
| Cu | 0.11 | 0.45 | 50 |
| As | 0.20 | 7.45 | 90 |
| Na | 9.11 | 2.03 | 5 |

*Solution from acid leach stage plus added reagents.

CAUSTIC LEACH

The residue of high arsenic content from the acid leach process stage 9 is leached with caustic at 38 to dissolve the arsenic. The temperature of the caustic leach slurry is maintained at about 95° C. with 10% initial loading of residue from the acid leach stage and the addition of 50% sodium hydroxide solution to obtain a SOGPL HaOH solution. Air is continuously added to the slurry at the rate of approximately 500 standard cubic feet per minute per 4.5 dry tons of acid leach residue. These reaction conditions are maintained for about 6 hours. The slurry is then filtered at 39 and the residue displacement washed. The residue is usually brown or green and is slower filtering than other residues in this process.

Table III below summarizes typical residue and filtrate qualities obtained from the caustic leach stage:

TABLE III

Caustic Leach Residue and Filtrate Quality

| Component | Filtrate | Residue % |
|---|---|---|
| Zinc | 2–5 gm/l | |
| Sodium | 35 gm/l | |
| Arsenic | 8–10 gm/l | |
| $H_2O$ | | 69.4 |
| *T/Zn | | ~3 |
| **W/Zn | | <1.0 |
| Cu | | 60 |
| Cd | | 1–2 |
| Pb | | ~1 |
| Co | | 3000 ppm |
| *T/S | | .7 |
| As | | <1 |
| Mn | | 4% |
| Ni | | <1% |
| Fe | | |

*T/Zn is total zinc; T/S is total sulfur.
**W/Zn is soluble zinc content.

ARSENIC REMOVAL AND PRODUCTION OF ZINC ARSENATE

The caustic leach filtrate is treated to remove arsenic by the addition of zinc and acid. The source of the zinc employed may be zinc neutral, or the source of zinc may be spent electrolyte both of which are obtained from the electrolytic zinc plant. Significantly, the filtrate subsequent to removal of the zinc arsenate, is a reagent and is recycled to the leaching jarosite circuit within the zinc plant.

The spent electrolyte which is obtained from commercial electrolytic zinc plant processes contains typically about 1 mole of zinc, and about 2 moles of sulphuric acid per liter. Zinc neutral is also obtained from the zinc plant and typically comprises a 3 molar zinc sulfate solution in water. Although the zinc content of the spent electrolyte or zinc neutral produced by the electrolytic zinc plant will vary, a sufficient amount of the neutral or spent is employed during the zinc arsenate precipitation process so as to provide about a mole or more of zinc per mole of arsenic content of the caustic leach filtrate which is treated.

Stoichiometry demands that to precipitate arsenic from the caustic leach filtrate solution, a mole of zinc should be added, per mole of arsenic in the caustic leach filtrate. However, in general a molar excess of zinc is preferred to insure the most comlete precipitation of the zinc arsenate. For example, from about 1.0 to 2.0 moles of zinc per mole of arsenic, such as 1.6 to 1.8 moles of zinc per mole of arsenic may be employed.

The precipitation of about 90% or more of the arsenic from the caustic leach filtrate employing zinc plant neutral is accomplished by first heating the caustic leach filtrate to from about 70°–90° C., and preferabiy 70° C., and adjusting the pH of the solution with for example, sulphuric acid to about 5.0–9.0 and preferably about 8.0. The neutral is then added and the pH is maintained in the 4.0 to 5.0 range, and preferably about 4.8 by the addition of acid or sodium hydroxide as required.

In particular, the precipitation of zinc arsenate from caustic leach filtrate was accomplished as follows: 2 liters of caustic leach filtrate was heated to about 70° C. and the pH was adjusted to about 8.0 with concentrated sulphuric acid (i.e. conc. $H_2SO_4$ 96%) which resulted in a slurry grayish in color. The slurry was stirred for about 15 minutes, after which 148 mls of zinc neutral was slowly added over a 10 minute period. Based on the arsenic content of the caustic leach filtrate, and the zinc content of the zinc neutral, about 1.662 moles of zinc was employed per mole of arsenic. In excess of 90% of the arsenic was recovered as a zinc arsenate precipitate. The zinc arsenate prepared by this procedure was found to be suitable for use as the arsenic source in the electrolyte purification step. In Table IV which summarizes the results of this procedure, "filtrate" refers to the filtrate obtained after the zinc arsenate precipitation step and "residue" refers to the zinc arsenate residue and CLF is caustic leach filtrate.

TABLE IV

Results of Arsenic Removal Employing Zinc Neutral

| | Component in Grams | | |
|---|---|---|---|
| | Zn | As | Na |
| Caustic leach filtrate | 8.600 | 20.000 | 92.00 |
| Zinc neutral | 20.42 | | |
| Total feed (neutral and CLF) | 29.02 | 20.000 | 92.00 |

TABLE IV-continued

Results of Arsenic Removal Employing Zinc Neutral

| | Component in Grams | | |
|---|---|---|---|
| | Zn | As | Na |
| Filtrate | 12.188 | 0.313 | 87.500 |
| Residue | 18.083 | 17.625 | 2.518 |
| % of component accounted for in filtrate and residue relative to total feed | 104.3% | 89.7% | 98.0% |
| % Distribution of component in the filtrate | 40.3% | 1.7% | 97.0% |
| % Distribution of component in the residue | 59.7% | 98.3% | 3.0% |

As an alternative to the use of zinc neutral, spent electrolyte provides a suitable source of zinc for the zinc arsenate precipitation process. In accordance with this aspect of the invention, the caustic leach filtrate is heated to from about 60°–90° C., preferably 70° C., and spent electrolyte is slowly added. The pH of the slurry which is produced upon the addition of the spent electrolyte will fluctuate. Subsequent to the addition of the spent electrolyte the slurry is maintained for about 30 minutes, and the pH is adjusted throughout the maintainance period at about 4.0 to 5.0, preferably 4.8 through the addition of concentrated sulphuric acid or sodium hydroxide as required. The slurry is then filtered to provide a zinc arsenate precipitate.

Table V summarizes results which were obtained employing the procedure outlined above on a bench scale employing spent zinc electrolyte as the zinc source:

TABLE V

Results of Arsenic Removal Employing Spent Zinc Electrolyte

| | Component Weight (gms) | | |
|---|---|---|---|
| | Zn | As | Na |
| Caustic leach filtrate | 8.600 | 20.000 | 92.000 |
| Spent zinc electrolyte | 23.500 | | |
| Total feed (spent and CLF) | 32.10 | 20.00 | 92.00 |
| Residue | 23.962 | 13.380 | 3.370 |
| Filtrate | 6.030 | 0.034 | 80.400 |
| % of component accounted for in residue and filtrate relative to total feed | 93.4 | 82.1 | 91.1 |
| % Distribution of component in filtrate | 20.1 | .2 | 96.0 |
| % Distribution of component in residue | 79.9 | 99.8 | 4.0 |

As is apparent from the results summarized by Table V above, 99.8% of the arsenic was removed from the caustic leach filtrate employing spent zinc electrolyte as the zinc source. Moreover, these results were obtained employing about 1.838 moles of zinc per mole of arsenic in the caustic leach filtrate.

Table VI, which follows, summarizes the results of several bench scale experiments wherein in excess of 90% of the arsenic contained in the caustic leach filtrate was precipitated as zinc arsenate employing the procedures set forth above.

TABLE VI

Preparation of Zinc Arsenate

| Trial No. | Reagent | G.P.L. "As" C.L.F. | Ratio Zinc Moles /Moles "As" | % "As" Removed From C.L.F. | G.P.L. "As" Filtrate | Residue Assays | |
|---|---|---|---|---|---|---|---|
| | | | | | | % Zn | % As |
| 1 | Neutral/$H_2SO_4$ | 10.0 | 1.662 | 98.3 | <0.1 | 23.7 | 23.1 |

TABLE VI-continued

| | | Preparation of Zinc Arsenate | | | | |
|---|---|---|---|---|---|---|
| Trial No. | Reagent | G.P.L. "As" C.L.F. | Ratio Zinc Moles /Moles "As" | % "As" Removed From C.L.F. | G.P.L. "As" Filtrate | Residue Assays |
| | | | | | | % Zn | % As |
| 2 | Spent | 10.0 | 1.838 | 99.8 | <0.1 | 25.6 | 17.5 |
| 3 | H$_2$SO$_4$ to pH 8 | 10.0 | 0.493 | 39.1 | 4.4 | 18.0 | 21.5 |
| 4 | Neutral/H$_2$SO$_4$ | 10.0 | 4.444 | 85.3 | 1.2 | 15.4 | 28.0 |
| 5 | Spent | 10.0 | 2.188 | 94.7 | 0.41 | 19.0 | 23.0 |
| 6 | H$_2$SO$_4$ to pH 4.5 | 6.8 | 0.674 | 56.7 | 2.50 | 22.4 | 32.0 |
| 7 | Neutral/H$_2$SO$_4$ | 6.8 | 4.043 | 87.0 | 0.88 | 28.6 | 30.0 |
| 8 | Spent | 6.8 | 2.478 | 97.2 | 0.23 | 32.1 | 31.0 |
| 9 | Spent | 10.0 | 1.778 | 98.0 | 0.20 | 28.5 | 21.0 |
| 10 | Neutral/H$_2$SO$_4$ | 10.0 | 1.364 | 96.5 | 0.38 | 23.0 | 31.0 |

The results of Table VI are obtained employing spent electrolyte which typically comprises about 45 grams per liter zinc, 0.1 ppm Cd, <5 ppm Fe, 0.1 ppm Cu, and 0.1 ppm Co. Zinc neutral typically contains approximately 140–150 grams per liter zinc, 0.1 ppm Cd, <5 ppm Fe, <0.1 ppm Cu, and <0.1 ppm Co. In Table VI CLF is caustic leach filtrate and G.P.L. is grams per liter. As a test for the amount of zinc present in the filtrate in Trials 3 and 6 acid was added to the caustic leach filtrate and resulted in the precipitation of zinc arsenate which is indicative of the presence of zinc in the caustic leach filtrate.

As a first point, it is noted that comparable residue and filtrate qualities result when the arsenic precipitation is accomplished with either spent electrolyte or zinc neutral/sulphuric acid. Typical zinc arsenate residue quality will be about 20–30% zinc, 20–30% As, 2–5% Na, <0.5% Cu, <0.1% Co, and about 6–7% total sulphur. Typical filtrate quality will be about 2 grams per liter Zn, <3 ppm Fe, <3 ppm Cu, <3 ppm Co, 35–40 grams per liter Na, 0.3 grams per liter Mn, 100 ppm As, and 3 ppm Ni. Moreover, as is apparent from Tables VII and VIII, below the present process results in filtrate and residue qualities similar to those produced by the removal of arsenic as copper arsenate from the caustic leach filtrate as disclosed by the process of U.S. Pat. No. 4,049,514 employing an external source of copper sulfate, not required by the present process. Table VII sets forth the residue and filtrate assays obtained for the residue and filtrate products produced by trials 1–10 respectively of Table VI. Table VIII sets forth typical copper arsenate slurry filtrate and residue qualities.

TABLE VII

| | Preparation of Zinc Arsenate - Final Slurry Filtrate and Residue Quality (Assays) | | | | | | | | | | |
|---|---|---|---|---|---|---|---|---|---|---|---|
| | Filtrate Quality - G.P.L. | | | | | Zinc Arsenate Residue Quality - % | | | | | |
| Trial No. | Zn | As | Na | Cu | Co | Zn | As | Na | Cu | Co | SO$_4$ |
| 1 | 3.90 | <0.1 | 28.0 | 0.070 | <0.003 | 23.7 | 23.1 | 3.30 | 0.10 | <0.10 | 0.47 |
| 2 | 1.80 | <0.1 | 24.0 | <0.002 | <0.003 | 25.6 | 17.5 | 3.60 | 0.07 | <0.10 | 0.94 |
| 3* | 1.00 | 4.40 | 41.0 | <0.002 | <0.003 | 18.0 | 21.5 | 5.90 | 0.22 | <0.10 | 0.14 |
| 4 | 10.50 | 1.20 | 39.0 | 0.010 | <0.003 | 15.4 | 28.0 | 2.30 | 0.12 | 0.01 | 4.27 |
| 5 | 10.50 | 0.41 | 39.0 | 0.010 | <0.003 | 19.0 | 23.0 | 3.10 | 0.17 | 0.03 | 5.48 |
| 6* | 0.80 | 2.50 | 32.0 | 0.010 | | 22.4 | 32.0 | 3.90 | 0.47 | | 3.23 |
| 7 | 4.00 | 0.88 | 34.0 | 0.006 | | 28.6 | 30.0 | 3.00 | 0.29 | | 3.03 |
| 8 | 4.50 | 0.23 | 33.0 | 0.002 | | 32.1 | 31.0 | 2.40 | 0.25 | | 3.89 |
| 9 | 4.10 | 0.20 | 41.0 | 0.030 | | 28.5 | 21.0 | 2.00 | 0.14 | | 3.29 |
| 10 | 4.90 | 0.38 | 41.0 | 0.004 | | 23.0 | 31.0 | 2.00 | 0.12 | | 1.65 |

*pH adjustments only - not actual ZnAs precipitations.

TABLE VIII

| | Typical Copper Arsenate Slurry Filtrate and Residue Quality | | | | | | | | | | |
|---|---|---|---|---|---|---|---|---|---|---|---|
| | Filtrate Quality - G.P.L. | | | | | Residue Quality - % | | | | | |
| Trial Day | Zn | As | Na | Cu | Co | Zn | As | Na | Cu | Co | SO$_4$ |
| 1 | 2.55 | 0.71 | 27.0 | 1.40 | 0.004 | — | — | — | — | — | — |
| 2 | 3.70 | 0.54 | 37.0 | 1.18 | <0.003 | 3.60 | 27.0 | 7.48 | 15.8 | | — |
| 3 | 1.20 | 0.12 | 42.0 | 0.30 | <0.003 | 9.10 | 16.0 | 7.40 | 9.9 | 0.003 | — |
| 4 | 1.10 | 0.20 | 35.0 | 0.10 | <0.003 | 9.80 | 20.0 | 7.00 | 19.2 | 0.005 | — |
| 5 | 0.50 | 0.24 | 30.0 | 0.05 | 0.028 | 13.50 | 22.1 | 6.70 | 8.6 | 0.084 | — |
| 6 | 2.15 | 0.14 | 34.0 | 0.37 | 0.170 | 7.00 | 22.0 | 8.30 | 19.7 | 0.167 | — |

Table IX summarizes zinc arsenate batch filtrate and residue qualities obtained on a plant scale.

TABLE IX

| | Zinc Arsenate Batch Filtrate and Residue Quality | | | | | | | |
|---|---|---|---|---|---|---|---|---|
| | FILTRATE | | | | | | | |
| Batch # | Zn (G.P.L.) | Fe (ppm) | Cu (ppm) | Co ppm | Na (G.P.L.*) | Mn (G.P.L.) | As (ppm) | Ni ppm |
| 1 | 2.05 | <2 | 45 | <3 | 36.8 | <0.01 | <100 | 4 |
| 2 | 1.05 | <2 | 4 | <3 | 22.5 | 0.52 | <100 | <3 |

TABLE IX-continued

Zinc Arsenate Batch Filtrate and Residue Quality

| 3 | 0.61 | <2 | 2 | <3 | 27.6 | 0.52 | <100 | <3 |
|---|------|----|----|----|------|------|------|----|
| 4 | 0.75 | <2 | 2 | <3 | 28.0 | 0.53 | <100 | <3 |
| 5 | 1.00 | <2 | 2 | <3 | 29.0 | 0.39 | <100 | <3 |
| 6 | 1.65 | <2 | 2 | <3 | 33.0 | 0.61 | <100 | <3 |
| 7 | 0.10 | <2 | 2 | <3 | 32.0 | 1.05 | <100 | <3 |

RESIDUE

| Batch # | $H_2O$ % | T/Zn % | W/Zn % | Cu % | Cd % | Co (ppm) | As % | Na % | Mn % | Ni % |
|---------|----------|--------|--------|------|------|----------|------|------|------|------|
| 1 | 71.8 | 10.9 | 0.04 | 17.2 | <0.01 | 30 | 22.3 | 7.20 | <0.01 | 0.0 |
| 2 | 60.3 | 28.7 | 0.01 | 0.23 | 0.02 | 30 | 20.0 | 4.30 | 2.90 | <0.0 |
| 3 | 71.5 | 29.7 | 0.11 | 0.11 | 0.02 | 30 | 13.4 | 6.70 | 3.08 | <0.0 |

A monthly average of zinc arsenate residue and post zinc arsenate precipitation filtrate qualities on a plant scale may have the following monthly average assay:

| Component | Residue % | Filtrate |
|-----------|-----------|----------|
| $H_2O$ | 69.4 | — |
| *T/Zn | 28.7 | 0.69 GPL |
| **W/Zn | 0.03 | — |
| Cu | 0.24 | 2 ppm |
| Cd | 0.08 | — |
| Co | 102 ppm | 3 ppm |
| As | 17.7 | 100 ppm |
| Na | 6.56 | 35 GPL |
| Mn | 2.63 | 0.31 GPL |
| Ni | 0.01 | 3 ppm |
| Fe | — | 2 ppm |

*T/Zn is total zinc;
**W/Zn is soluble zinc;
g.p.l. is grams per liter.

Filtration of zinc arsenate slurry is slightly slower than filtration of copper arsenate slurries. Lab tests indicate that it takes approximately 6 to 9 minutes to filter 1 liter of copper arsenate slurry through 15 cm Whatman No. 4 filter paper at about 88 kilopascals, while it takes 10–15 minutes to filter zinc arsenate slurry under similar conditions. Table X below provides a comparison of zinc arsenate slurry filtration rates for zinc arsenate precipitated employing either spent or neutral, versus copper arsenate slurry filtration rates.

Moreover, the amount of zinc required to precipitate the zinc arsenate is calculated as follows:

$$\text{Moles As/batch} = \frac{\text{Volume C.L.F. (liters)}}{\text{batch}} \times \text{As g/l} \times \frac{1 \text{ mole}}{74.9 \text{ gm}}$$

$$= \underline{\quad\quad} \text{ moles As per batch}$$

$$\text{gm Zn required} = \underline{\quad\quad} \frac{\text{moles As}}{\text{batch}} \times \frac{65.4 \text{ gm}}{\text{mole}} \text{ Zinc}$$

$$= \underline{\quad\quad} \text{ gm zinc}$$

$$\text{or volume of solution required} = \frac{\text{gms zinc required}}{\text{gms zinc in spent or neutral}}$$

In the above formula C.L.F. is caustic leach filtrate and g/l is grams per liter.

ELECTROLYTIC PURIFICATION

The zinc arsenate obtained from the arsenic removal step is employed as the source of all or a substantial amount of the arsenic needed to precipitate cobalt impurity from the impure electrolyte. On a commercial plant scale the total zinc arsenate produced may be insufficient to supply the total arsenic requirements of the electrolytic purification step described herein. However, the zinc arsenate prepared in accordance with this invention by recycling spent electrolyte or zinc neutral, provides a major source of arsenic for the electrolytic purification step, thereby greatly reducing the amount of arsenic trioxide or copper sulfate/arsenic

TABLE X

Zinc Arsenate Filtration Versus Copper Arsenate Filtration

| Trial | Slurry | Pulp Density | Specific Gravity Filtrate | Temp. °C. | Solids Dry Wt. | G.P.L. Solids | pH °C. | *Time to Filter (min.) |
|-------|--------|--------------|---------------------------|-----------|----------------|---------------|--------|------------------------|
| 1 | ZnAs (neutral) | — | — | 70° C. | 24.8g | 25 | 4.5/70 | 15 |
| 2 | ZnAs (neutral) | — | — | 70° C. | 22.5g | 23 | 4.5/70 | 12 |
| 3 | ZnAs (neutral) | 1.130 | 1.125 | 70° C. | 14.0g | 14 | 4.5/70 | 5 |
| 4 | ZnAs (Spent) | — | — | 70° C. | 31.2g | 31 | 4.5/70 | 10 |
| 5 | ZnAs (Spent) | 1.135 | 1.125 | 70° C. | 21.4g | 21 | 4.5/70 | 13 |
| 6 | ZnAs (spent) | 1.135 | 1.130 | 69° C. | 43.9g | 44 | 4.3/70 | 12 |
| 7 | C.L.F. (pH-4.5) | — | — | 70° C. | 13.0g | 13 | 4.5/70 | 10 |
| 8 | CuAs | 1.130 | 1.125 | 70° C. | 34.3g | 34 | 4.6/70 | 12 |
| 9 | CuAs | 1.120 | 1.115 | 70° C. | 33.1g | 33 | 4.7/70 | 7¼ |
| 10 | CuAs | 1.120 | 1.115 | 70° C. | 32.5g | 33 | 4.7/70 | 5 |
| 11 | CuAs | 1.130 | 1.115 | 72° C. | 149g | — | 4.5/70 | 6 |
| 12 | CuAs | 1.135 | 1.130 | 70° C. | 57.g | 57 | 4.3/70 | 8½ |

*Time to filter 1 liter of slurry through a 15 cm Whatman No. 4 filer paper with a 11 cm screen at 26" Hg vacuum.
**C.L.F. is caustic leach filtrate.

On plant scale about 0.25 m³ volume per m³ of caustic leach filtrate would be required if spent electrolyte were utilized as the zinc source. If neutral solution (with $H_2SO_4$ for pH adjustment) was utilized approximately 0.125 m³ volume per m³ of caustic leach filtrate would be required.

trioxide reagents which must be purchased from outside sources. Preferably any deficiency in the amount of arsenic provided by zinc arsenate is provided by a "make-up" amount of arsenic trioxide.

With reference to FIG. 1, 5 represents impure zinc electrolyte which has been obtained from the leaching of roasted zinc oxide concentrate by sulphuric acid by conventional methods and which is subjected to the zinc electrolyte purification step of this invention. The impure zinc electrolyte which is treated in accordance with this process typically has the following composition with reference to the major components:

TABLE XI

| | |
|---|---|
| Zn(gram/liter) | ~135 |
| Cd(ppm) | ~460 |
| Fe(ppm) | ~5-10 |
| Cu(ppm) | ~500-1500 |
| Co(ppm) | ~20-30 |
| As(ppm) | <1 |
| Ni(ppm) | 1-2 |

The impure electrolyte is treated with zinc dust and zinc arsenate to provide a residue, which is referred to as the cement copper cake, and a filtrate of low cobalt content of about 0.1 ppm which is suitable for electrolytic treatment at the zinc plant 45. In one embodiment of the process the electrolytic purification is accomplished as follows:

To the impure electrolyte, at about 80°-95° C., is added about 2 to 5 grams per liter of zinc dust and a sufficient amount of zinc arsenate to provide for impure electrolyte from about 0.07 to about 0.20, and preferably about 0.1 grams of arsenic per liter of impure electrolyte to be treated. The temperature is maintained at 90° to 95° C. and the mixture is stirred until the cobalt level is less than about 0.1 ppm. When this cobalt level is reached, the pH of the solution is adjusted to from about 3.0 to 5.0, and preferably 4.0, and the mixture is filtered with filtrate being delivered to second stage of purification for further purification, and a residue which comprises the cement copper cake. The zinc arsenate may be added as a solid, or as a slurry in water which is prepared by placing a suitable amount of the zinc arsenate in water. Alternatively, as is discussed below a suitable amount of zinc arsenate may be dissolved in water and acid prior to addition to the impure electrolyte.

Arsenic is added as zinc arsenate, either as a slurry, solid or solution in sufficient amount to precipitate a major amount of cobalt from the impure electrolyte and, it is preferred that the cobalt content of the purified electrolyte solution contain less than about 0.1 ppm cobalt. In general about 4 to 8 pounds of zinc arsenate will be required per ppm cobalt per 163.4 m$^3$ of impure electrolyte. The quantity of zinc dust added will be an amount adequate to react continuously with the free sulphuric acid to form zinc sulphate and hydrogen gas ($H_2$) to provide the reducing condition of the electrolyte undergoing purification.

In addition to the use of a zinc arsenate slurry, or solid, as the arsenic source during the first stage electrolyte purification, the zinc arsenate may be added as a solution of dissolved zinc arsenate prepared as follows:

Zinc arsenate is slurried in water at 20°-30° C. and the pH is adjusted to 2.0 or less. It has been noted that the zinc arsenate dissolves faster at lower pH levels i.e., 0.5. The pH adjustment is accomplished with either concentrated $H_2SO_4$ or an acid by-product such as spent electrolyte.

The preparation of a zinc arsenate solution wherein the solution (filtrate) contained 100% of the zinc and 90(+) % of the arsenic was demonstrated on a lab scale as follows:

106.0 grams of zinc arsenate (wet) and 34.5 grams of zinc arsenate (dry) was added to 500 ml's of water, and the pH of the mixture was adjusted to approximately 2.0 employing spent electrolyte solution as the acid source. In this experiment 120 ml of spent was required. The mixture was slurried for about 30 minutes, the temperature ranged from 20° C. (start)-23° C. (end). The filtrate was totally about 800 mls in volume including a 125 ml wash which was greenish in color. The residue was dark brown in color and weighed about 1.7 grams. The filtrate and the zinc arsenate dissolved therein had the following assay:

TABLE XII

| Component | Assay of ZnAsO from Arsenic Removal Step % | Assay of Filtrate gm/liter | % Distribute in Filtrate |
|---|---|---|---|
| Zn | 20.4 | 16.2 | 100% |
| As | 21.0 | 8.10 | 90(+)% |
| Cu | 5.50 | 3.25 | |
| Co | 0.04 | 0.02 | |
| H$_2$O | 67.5 | | |
| % Solids (32.5) | | | |

The process of the preceding paragraph was repeated on bench scale, except that the zinc arsenate water mixture was acidified with concentrated sulphuric acid (96%) as follows:

114.6 gms of ZnAsO (wet) and 37.2 gms of ZnAsO (dry) was added to 500 ml of water, and the pH of the mixture was adjusted to 2.0 with concentrated sulphuric acid (approximately 12.0 ml). The process was run at a temperature range of 20°-25° C. The mixture was slurried for about 30 minutes. The filtrate, approximately 760 ml including a 125 ml wash fraction, was greenish in color. The residue was dark brown in color and weighed about 2.7 grams. The filtrate and zinc arsenate sample from the arsenic removal step which was dissolved as described above had the following assay:

TABLE XIII

| Component | Assay of ZnAsO from Arsenic Removal Step % | Assay of Filtrate grams/liter | % Distribution of Component in Filtrate |
|---|---|---|---|
| Zn | 20.4 | 10.8 | 100% |
| As | 21.0 | 9.20 | 90% (+) |
| Cu | 5.50 | 3.70 | |
| Co | 0.04 | 0.02 | |
| H$_2$O | 67.5 | | |
| % Solids = 32.5% | | | |

The use of the dissolved zinc arsenate in the electrolytic purification step is analogous to the procedure outlined above for the use of zinc arsenate slurry or solid where upon addition of the zinc arsenate the pH of the mixture is allowed to ride at about pH 2-5, and preferably 3.0, and after the cobalt level has reached about 0.1 ppm the pH is adjusted to about 3.0 to 5.0 and preferably 4.5.

Table XIV summarizes cobalt removal from impure electrolyte on plant scale obtained employing dissolved zinc arsenate as the arsenic source. The zinc arsenate solution was added to the impure electrolyte and maintained at the pH range indicated by the table for the first hour and thereafter the pH was adjusted to about 4.0.

TABLE XIV

| Trial | IMPURE - ppm | | | REAGENT LEVEL | | Total | pH during first hour of | COBALT-ppm | | |
|---|---|---|---|---|---|---|---|---|---|---|
| | Cu | Co | Cd | GPL "As" | GPL "Zn" | Zn(Kg) | treatment | 1 Hr. | 1½ Hr. | 2 Hr. |
| 1 | 820 | 22 | 450 | 0.124 | — | — | 3.0 | 0.4 | 0.1 | 0.1 |
| 2 | 860 | 22 | 520 | 0.099 | 5.28 | 863 | 4.0 | 0.2 | 0.1 | 0.1 |
| 3 | 860 | 22 | 520 | — | 5.42 | 886 | 3.5–4.0 | 0.5 | 0.4 | 0.4 |
| 4 | 810 | 25 | 510 | 0.080 | 4.86 | 794 | 3.5–4.0 | 0.3 | 0.1 | 0.1 |
| 5** | 1080 | 32 | 510 | *0.127 | 5.59 | 914 | 4.5–5.0 | 5 | 1 | 0.3 |
| 6** | 1080 | 32 | 510 | *0.151 | 6.36 | 1040 | 4.0–4.5 | 0.5 | 0.5 | 0.3 |

*Not 100% dissolved.
**Required extra reagents and time to remove cobalt. (3–3½ hours).

As is apparent from this Table XIV adequate cobalt removal is obtained through the use of dissolved zinc arsenate. However, poor cobalt removal is noted in the higher pH ranges over the first hour of treatment. This may be due to incomplete dissolution of arsenic or possibly reprecipitation of some of the arsenic from the solution upon addition to the impure electrolyte due to a high pH (~5) of the electrolyte at the time of addition. Maintaining the pH of the electrolyte zinc arsenate mixture at about 3.0 is preferred since cobalt removal is greatest during the first hour at this pH level.

Table XV illustrates the treatment on a bench scale of impure and low copper impure electrolyte of about a 3 liter batch with zinc arsenate slurry, producing filtrates having cobalt concentration levels suitable for electrolytic processes. The column indication "spent" refers to the volume of spent electrolyte employed to perform the pH adjustments of the purification process. Table XV also indicates the source of zinc which was employed to precipitate the zinc arsenate from the caustic leach filtrate.

TABLE XV

| | Impure Electrolyte (ppm) | | | | Conditions Used - Reagents | | | Zn | Cobalt in Filtrate Results - Cobalt ppm | | | |
|---|---|---|---|---|---|---|---|---|---|---|---|---|
| Trial | Cu | Co | Cd | Temp. | Zinc (G.P.L.) | As (G.P.L.) | Filtrate Cadmium (ppm) | Spent Source | 1 hr | 1½ hr | 2 | 2½ |
| 1 | 1200 | 36 | 550 | 95° C. | 6.33 | 0.15 | | neutral | <5 | 0.3 | <0.1 | |
| 2 | 1200 | 36 | 550 | 95 | 7.00 | 0.15 | | spent | <5 | 0.5 | 0.3 | 0.1 |
| 3 | 1170 | 27 | 520 | 95 | 6.00 | 0.056 | | neutral | <5 | <5 | 2 | |
| 4 | 185 | 27 | 470 | 95 | 5.00 | 0.056 | | neutral | <5 | 5 | 2 | |
| 5 | 1260 | 27 | 490 | 95 | 7.50 | 0.100 | 410 | 150 ml neutral | <5 | 1 | 0.1 | |
| 6 | 1260 | 27 | 490 | 95 | 6.00 | 0.100 | 425 | 100 ml neutral | <5 | 0.2 | 0.1 | |
| 7 | 185 | 27 | 470 | 95 | 5.33 | 0.100 | 200 | 80 ml neutral | <5 | <1 | 0.1 | |
| 8 | 1260 | 27 | 490 | 95 | 5.33 | 0.100 | 490 | 100 ml spent | <5 | 0.1 | 0.1 | |
| 9 | 185 | 27 | 470 | 97 | 5.67 | 0.100 | 280 | 100 ml spent | <5 | <1 | 0.3 | 0.1 |
| 10 | 1040 | 31 | 600 | 96 | 5.00 | 0.128 | 145 | C.L.F. | <5 | <1 | 0.1 | |
| 11 | 62 | 29 | 600 | 96 | 5.00 | 0.128 | 205 | C.L.F. | | <1 | 0.1 | |
| 12 | 1040 | 31 | 600 | 95 | 6.33 | 0.082 | 320 | 86 ml spent | | 0.2 | 0.1 | |
| 13 | 62 | 29 | 600 | 95 | 5.33 | 0.082 | 100 | 50 ml spent | <5 | — | <0.1 | |
| 14 | 1040 | 31 | 600 | 95 | 5.33 | 0.082 | 410 | 65 ml spent | | 0.1 | <0.1 | |
| 15 | 62 | 29 | 600 | 95 | 4.33 | 0.082 | 440 | 65 ml spent | | 0.1 | <0.1 | |
| 16 | 1040 | 31 | 600 | 95 | 5.00 | 0.075 | 530 | spent | <1 | 0.5 | 0.3 | 0.1 |
| 17 | 62 | 29 | 600 | 95 | 3.33 | 0.075 | 460 | spent | | 0.1 | <0.1 | |
| 18 | 1040 | 31 | 600 | 95 | 5.33 | 0.105 | 530 | spent | <5 | <1 | 0.2 | |
| 19 | 62 | 29 | 600 | 95 | 3.67 | 0.105 | 180 | spent | | >1 | <0.1 | |

As is apparent from Table XV, cobalt levels of less than 0.1 ppm were obtained using zinc arsenate obtained from spent electrolyte and zinc neutral. Trials 3, 4 and 18 failed to result in a cobalt content of ≦0.1 ppm in the solution, since the arsenic content ~0.056 gms/liter was too low relative to the cobalt content of the impure electrolyte. Low copper impure refers to impure electrolyte from which a major portion of the copper has been removed such as by prior treatment with zinc dust. Trials 13, 16, 18, 20, 22, 24, 26 and 28 are based on low copper impure electrolyte.

Table XVI, illustrates bench scale cement copper cake residue assays obtained from the first stage electrolytic purification process of this invention utilizing zinc arsenate for the treatment of impure electrolyte and low copper impure electrolyte in accordance with the zinc arsenate slurry addition process described above.

TABLE XVI

First Stage Purification Residue Weights and Assays - Utilizing ZnAsO as "As" Source

| | LOW COPPER IMPURE | | | | | | | IMPURE | | | | | |
|---|---|---|---|---|---|---|---|---|---|---|---|---|---|
| | Residue | Residue Assays* | | | | | | Residue | Residue Assays | | | | |
| Trial | gms | %Zn | %Cu | %Cd | %Co | %As | Trial | gm(Dry) | %Zn | %Cu | %Cd | %Co | %As |
| 1 | 5.5 | 34.5 | 5.00 | 6.15 | 0.45 | 1.60 | 7 | 16.3 | 9.00 | 59.0 | 4.00 | 1.10 | 5.10 |
| 2 | 3.7 | 30.0 | 10.20 | 13.6 | 3.55 | 4.20 | 8 | 8.1 | 14.0 | 47.8 | 2.50 | 0.63 | 3.40 |
| 3 | — | 33.0 | 3.60 | 15.3 | 1.00 | 3.90 | 9 | 7.3 | 31.7 | 17.2 | 8.25 | 0.43 | 2.70 |
| 4 | 3.5 | 41.9 | 6.85 | 18.2 | 1.70 | 4.70 | 10 | 5.3 | 12.3 | 53.8 | 11.5 | 1.45 | 4.80 |
| 5 | 3.9 | 25.8 | 15.50 | 4.60 | 3.45 | 7.80 | 11 | 5.7 | 6.80 | 59.1 | 5.75 | 1.80 | 4.80 |
| 6 | 4.2 | 32.0 | 8.25 | 14.50 | 1.30 | 5.00 | 12 | 5.6 | 9.00 | 59.5 | 6.20 | 1.70 | 4.80 |

*Cement Copper Cake.

The following Table XVII summarizes monthly averages on plant scale of first stage electrolyte purifications, providing a comparison of filtrate and residue qualities prepared employing zinc arsenate slurry or dissolved zinc arsenate.

TABLE XVII

COMPARISON OF ZINC ARSENATE SLURRY AND DISSOLVED ZINC ARSENATE PURIFICATION RESIDUE AND FILTRATE FIRST STAGE - BATCH - MONTHLY AVERAGE

| DESCRIP- | ZnAsO SLURRY | | | ZnAsO DISSOLVED | |
|---|---|---|---|---|---|
| TION | Month 1 | Month 2 | Month 3 | Month 4 | Month 5 |
| Filtrate Quality | | | | | |
| Cd (ppm) | 414 | 444 | 471 | 475 | 500 |
| Co (ppm) | 0.3 | 0.2 | 0.3 | 0.3 | 0.3 |
| As (ppm) | 0.1 | 0.1 | 0.1 | 0.1 | 0.1 |
| Residue Quality | | | | | |
| $H_2O$-% | 45.1 | 44.2 | 44.3 | 46.8 | 45.9 |
| *T/Zn-% | 19.5 | 18.7 | 17.9 | 19.6 | 18.8 |
| Cu-% | 35.3 | 36.1 | 37.0 | 33.6 | 34.0 |
| Cd-% | 1.79 | 1.48 | 1.36 | 1.52 | 1.44 |
| T/S-% | 7.15 | 7.46 | 6.93 | 7.15 | 7.02 |
| As-% | 4.38 | 4.51 | 5.06 | 5.55 | 5.64 |

*T/Zn refers to total zinc; and T/S refers to total sulfur.

Table XVIII summarizes typical copper cement cement cake residue, and first stage filtrate qualities on plant scale.

TABLE XVIII

Purification Solution and Residue Quality

| | SOLUTION IMPURE | | | | | FILTRATE 1st STAGE | | | RESIDUE 1st STAGE | | | | | |
|---|---|---|---|---|---|---|---|---|---|---|---|---|---|---|
| Trial# | Zn (GPL) | Cd (ppm) | Fe (ppm) | Cu (ppm) | Co (ppm) | As (ppm) | Cd (ppm) | Co (ppm) | As (ppm) | $H_2O$ % | T/Zn % | Cu % | Cd % | T/S % | As % |
| 1 | 125 | 460 | 3 | 850 | 28 | 0.18 | 460 | 0.2 | <0.1 | 41.0 | 20.0 | 34.1 | 1.66 | 8.80 | 3.7 |
| 2 | 123 | 560 | 3 | 925 | 33 | 0.36 | 500 | 0.2 | 0.8 | 46.0 | 18.3 | 34.0 | 2.14 | 7 | 4.4 |
| 3 | 123 | 480 | 3 | 1045 | 35 | 0.44 | 340 | 0.3 | <0.1 | 45.1 | 18.2 | 34.6 | 1.82 | 7.26 | 4.1 |
| 4 | 121 | 430 | 2 | 915 | 40 | 0.30 | 360 | 0.2 | <0.1 | 42.4 | 18.3 | 33.8 | 1.91 | 7.57 | 4.9 |
| 5 | 125 | 435 | 2 | 980 | 40 | 0.56 | 400 | 0.4 | <0.1 | 48.2 | 18.9 | 33.4 | 1.80 | 7.51 | 5.1 |
| 6 | 123 | 455 | 2 | 1010 | 46 | 0.30 | 400 | 0.4 | 0.26 | 46.0 | 18.1 | 34.6 | 1.69 | 7.06 | 6 |
| 7 | 130 | 485 | 3 | 1150 | 41 | 0.50 | 440 | 0.1 | <0.1 | 44.9 | 17.2 | 37.6 | 1.62 | 7.05 | 5.7 |
| 8 | 131 | 590 | 3 | 1215 | 44 | 3.00 | 510 | | <0.1 | 42.4 | 17.5 | 35.5 | 1.86 | 7.38 | 5.9 |

First stage impure electrolyte treatment employing either zinc arsenate slurry or zinc arsenate dissolved in acid as described above typically will result in the following plant scale, residue cement copper cake and filtrate qualities:

TABLE XIX

First Stage Residue and Filtrate Qualities

| Filtrate Quality | | Residue Quality | |
|---|---|---|---|
| Zn (gpl*) | ~140 | $H_2O$ % | ~45-50 |
| Cu (ppm) | ~0.1 | T/Zn % | ~15-20 |
| Co (ppm) | ~0.1 | Cu % | ~25-35 |
| Cd (ppm) | ~500 | Cd % | ~1-2 |
| As (ppm) | <.1 | T/S % | ~4-8 |
| | | As % | ~5-7 |

*gpl = grams/liter

Figure 2:
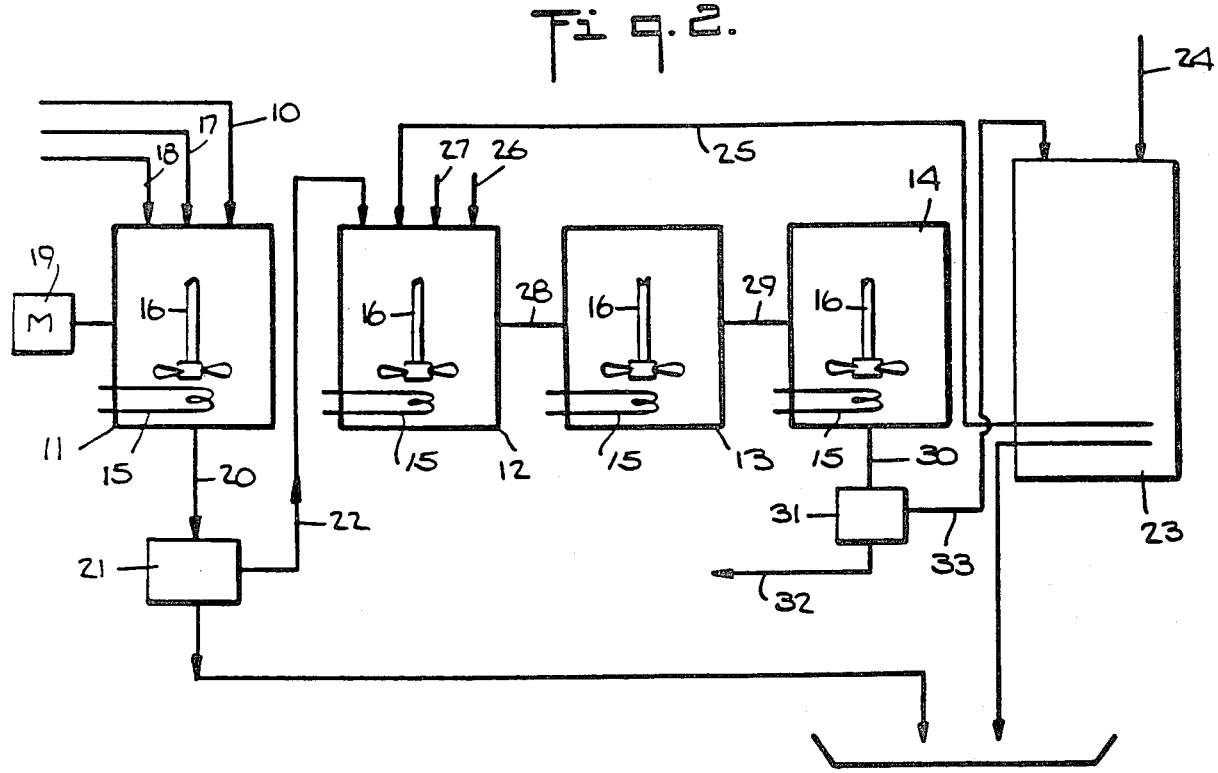
FIG. 2 is a schematic of an apparatus for use in accordance with the process of this invention, particularly illustrating the flow of product through the various process steps.

FIG. 2 describes an alternative embodiment of the invention wherein, the impure zinc electrolyte obtained from the leaching of the roasted zinc oxide concentrate by sulfuric acid is delivered continuously through line 10 to tank 11 connected in series to tanks 12, 13 and 14. All tanks contain steam coils 15 for temperature control, and in addition, all tanks are equipped with agitators 16 to achieve mixing and sustained agitation of the reagent and other additions within the tank.

The impure zinc electrolyte is delivered continuously to tank 11 at a controlled rate of flow to give a preferred residence time in tank 11 of one hour. The residence time in tank 11 is one of the determinants of the degree of copper removal (decopperization) and quality (grade and impurity content) of the precipitate. In addition to impure electrolyte, fine zinc dust (less than about +72 Tyler mesh) is delivered to tank 11 through conduit 17 and dilute sulfuric acid (cellhouse circulating solution, 15% $H_2SO_4$ content) is introduced through line 18, to achieve the removal of copper from the electrolyte in the form of a solid precipitate referred to as "cement copper."

The decopperization process is carried out at a temperature of about 80° C. maintained by means of the coil 15 within the tank. The electrolyte acidity is adjusted to a pH of from about 3 to 5, and preferably about pH 3.0 by the addition of the dilute acid and is maintained at that level by regulating the acid addition at a constant flow to achieve the desired pH value.

Figure 3:
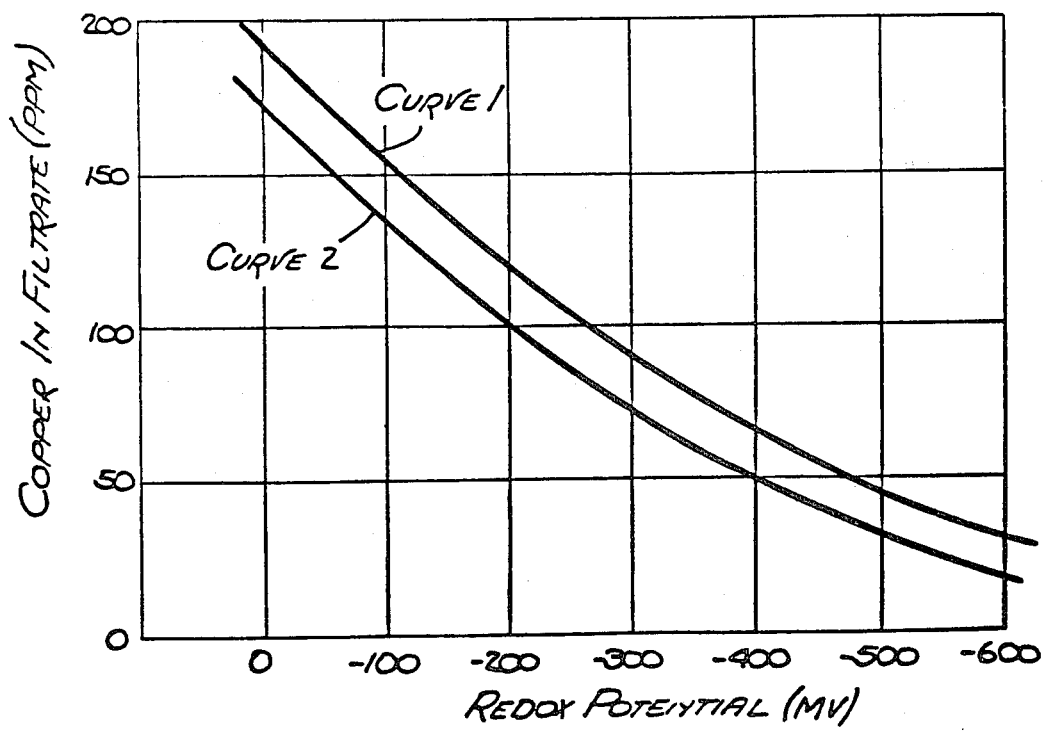
FIG. 3 is a plot of redox potential versus copper during the electrolyte purufication step of the process.

As mentioned above, the quantity of fine zinc dust added is controlled to be approximately equivalent to the calculated stoichiometric quantity required to displace the copper from solution. The zinc dust addition is monitored and can be controlled on a continuous basis using the redox (reduction-oxidation) potential of the electrolyte solution, the potential being expressed as mv (millivolts). Millivolt meter 19 forms part of a control loop for the addition of zinc dust. The redox potential in this process is set to control zinc dust addition to give an electrolyte potential of from about +200 to about −600 mv. The redox range employed determines the degree of decopperization, influences the quality of the final product, and limits the precipitation of extraneous metals other than the copper. FIG. 3 shows the effect of redox potential and retention time on the removal of copper during the treatment in tank 11.

The solution containing the electrolyte and precipitated copper (slurry) is withdrawn from tank 11 through line 20 at a rate consistent with electrolyte addition to the tank, to achieve a constant liquid level in tank 11. The slurry is withdrawn conveniently by any well-known means, e.g., syphon, stillwells or tank bottom outlets as shown in FIG. 2, and is then pumped to pressure filter 21 such as a Shriver press or other conventional liquid-solids separation equipment (e.g., settling tanks, drum filters, cyclones, centrifuges, etc.). The clarified solution is delivered through conduit 22 to tank 12, the second tank in the series. The precipitated cement copper product may be washed in press 21, and is treated further as described below to become the first product of the process, having an assay of approximately 90% by weight copper, 1% combined zinc and cadmium, and nil arsenic. The cement copper alternately may be shipped to a copper smelter or converted to liquid copper sulfate for use as a milling reagent.

Typical assays for the impure electrolyte, cement copper and clarified solution involved in the first stage of the process as described above in reference to tank 11 is shown in Table XX.

TABLE XX

| Impure Electrolyte | Cemented Copper | Clarified Solution |
|---|---|---|
| Cu-723 ppm | Cu-93.6% | Cu-336 ppm |
| Zn-124 g/l | Zn-0.51% | Zn-125.7 g/l |
| Cd-473 ppm | Cd-0.43% | Cd-489 ppm |
| Co-18 ppm | Co-0.002% | Co-18 ppm |
| As-0.62 ppm | As-0.22% | As-0.68 ppm |

To the solution in tank 12 is added a regulated continuous stream of zinc arsenate as slurry or as a solution, to satisfy the objective of the purification. As shown in FIG. 2, previously inventoried cement copper cake containing approximately 42% by weight copper and 7% by weight arsenic is introduced into treatment section 23 through line 24 wherein it is treated in accordance with the acid leach, caustic leach and arsenic removal steps of this invention which are described above to provide zinc arsenate which is delivered as an acid solution or slurry through line 25 to tank 12. The zinc arsenate addition is calculated to give an arsenic concentration of up to 4.499 grams (As content) per cubic meter of electrolyte flow multiplied by the cobalt assay in milligrams per liter. In those instances where the total arsenic requirements are not met by the zinc arsenate produced, a make-up quantity of a second arsenic source, such as arsenic trioxide, is slurried or dissolved in acid and water with the zinc arsenate so as to provide the total arsenic requirements of the process and, the arsenic containing slurry or solution is supplied by line 25 to tank 12. Alternatively, a separate line may be connected to tank 12 to introduce arsenic trioxide slurry or solution.

To tank 12 through line 26 is also added spent acid or sulfuric acid in an amount to give a pH value of from about 3.0 to 4.5, and preferably about 4.0. Coarse zinc dust (of a size greater than about +72 Tyler mesh) is added through line 27 in an amount adequate to react continuously with the free sulfuric acid to form zinc sulfate and evolve hydrogen gas to provide the necessary reducing conditions of the electrolyte undergoing purification. In tank 12 approximately 90% of the cobalt is removed.

Typical assays of the residue and exiting solution from tank 12 is shown in Table XXI.

TABLE XXI

| Residue | Solution |
|---|---|
| Cu - 9.3% | Cu - 4 ppm |
| Zn - 33.1% | Zn - 135.1 g/l |
| Cd - 2.03% | Cd - 279 ppm |
| Co - 0.29% | Co - 5 ppm |
| As - 2.35% | As - 1.81 ppm |

Although optionally the precipitated cobalt could be removed from the slurry upon its leaving tank 12, in the preferred embodiment, the entire slurry is delivered to tank 13 through conduit 28 where additional acid and coarse zinc dust are added if necessary to give the solution an increased pH of approximately 3.5 to 4.5.

A typical assay of the residue and exiting solution from tank 13 is shown below in Table XXII.

TABLE XXII

| Residue | Solution |
|---|---|
| Cu - 10.8% | Cu - 0.3 ppm |
| Zn - 28.3% | Zn - 142.5 g/l |
| Cd - 3.31% | Cd - 325 ppm |
| Co - 0.45% | Co - 0.6 ppm |
| As - 2.05% | As - 1.05 ppm |

From tank 13 the electrolyte and solids are delivered through conduit 29 to tank 14. At this point, the cobalt level in the solution is less than about 1 ppm as shown in Table XXII. To tank 14 a small amount of coarse zinc dust is added to insure the continuing reducing conditions described earlier and the acidity in the tank is allowed to decrease to a pH value of from about 4.0 to 4.5. The addition of zinc dust is in an amount sufficient to ultimately decrease the cobalt level to less than about 0.1 ppm and satisfy the Gutzeit arsenic/antimony test for completeness of purification. The electrolyte and precipitated suspended cobalt and related impurities are pumped at a regulated rate through line 30 to conventional liquid-solids separation means 31 of the type described above.

The filtrate, now clarified electrolyte, is delivered through line 32 for further utilization and the separated solids are delivered through line 33 to section 23 for further treatment in accordance with the acid leach, caustic leach and arsenic removal procedures of this invention.

A typical assay of the residue and solution resulting from the treatment in tank 14 is shown below in Table XXIII.

TABLE XIII

| Residue | Solution |
|---|---|
| Cu - 11.9% | Cu - 0.25 ppm |
| Zn - 27.4% | Zn - 140.5 g/l |
| Cd - 2.93% | Cd - 341 |
| Co - 0.49% | Co - 0.15 ppm |
| As - 2.32% | As - 0.44 ppm |

As is illustrated by Table XXIV, consumption of arsenic in the first stage purification step is comparable to arsenic consumption employing arsenic trioxide in accordance with conventional impure electrolyte purification methods. Table XXIV summarizes plant scale arsenic consumption over a 17 day period, wherein the arsenic consumption is expressed as moles of arsenic employed as zinc arsenate (slurry addition) or arsenic trioxide per ppm cobalt in impure per liter impure basis. As mentioned above, a sufficient amount of arsenic is employed to reduce the cobalt content of the impure to <0.1 ppm.

TABLE XXIV

COMPARISON - "ARSENIC CONSUMPTION"-
FIRST STAGE BATCH
PURIFICATIONS WITH ZINC
ARSENATE SLURRY AND ARSENIC TRIOXIDE

| Day | Impure Co (ppm) | Moles "As"/ppm Co/Liter c̄ Zinc Arsenate | Moles "As"/ppm Co/Liter c̄ As$_2$O$_3$ |
|---|---|---|---|
| 1 | 43 | | 5.03 × 10$^{-5}$ |
| 2 | 38 | 5.63 × 10$^{-5}$ | 5.70 × 10$^{-5}$ |
| 3 | 37 | 5.30 × 10$^{-5}$ | 5.85 × 10$^{-5}$ |
| 4 | 34 | 4.59 × 10$^{-5}$ | — |
| 5 | 31 | 5.37 × 10$^{-5}$ | — |
| 6 | 32 | 5.17 × 10$^{-5}$ | — |

TABLE XXIV-continued
COMPARISON - "ARSENIC CONSUMPTION"- FIRST STAGE BATCH PURIFICATIONS WITH ZINC ARSENATE SLURRY AND ARSENIC TRIOXIDE

| Day | Impure Co (ppm) | Moles "As"/ppm Co/Liter c̄ Zinc Arsenate | Moles "As"/ppm Co/Liter c̄ $As_2O_3$ |
|---|---|---|---|
| 7  | 34 | $4.86 \times 10^{-5}$ | $4.00 \times 10^{-5}$ |
| 8  | 28 | $6.08 \times 10^{-5}$ | $4.86 \times 10^{-5}$ |
| 9  | 28 | $5.47 \times 10^{-5}$ | — |
| 10 | 28 | $4.99 \times 10^{-5}$ | — |
| 11 | 35 | $3.88 \times 10^{-5}$ | — |
| 12 | 30 | $3.66 \times 10^{-5}$ | $4.53 \times 10^{-5}$ |
| 13 | 30 | $3.00 \times 10^{-5}$ | $4.12 \times 10^{-5}$ |
| 14 | 29 | $5.61 \times 10^{-5}$ | $4.48 \times 10^{-5}$ |
| 15 | 29 | $4.94 \times 10^{-5}$ | $4.69 \times 10^{-5}$ |
| 16 | 28 | Not Used | $4.64 \times 10^{-5}$ |
| 17 | 29 | $4.90 \times 10^{-5}$ | $4.48 \times 10^{-5}$ |

Table XXV summarizes arsenic consumption and zinc arsenate production over a 25 day period on plant scale. This table also summarizes zinc arsenate produced during the arsenic removal step.

first stage electrolyte purification step. Although frequently, the zinc arsenate will be sufficient in amount to provide the total arsenic requirements, in some cases it may be necessary to employ the zinc arsenate in combination with a second arsenic source to provide the total arsenic requirements of the first stage electrolyte purification. The second arsenic source may be any compound capable of providing soluble arsenic such as arsenic trioxide or copper arsenate, although preferably arsenic trioxide is employed. The zinc arsenate and second arsenic source are employed in sufficient amounts so that the total amount of arsenic is sufficient to reduce the cobalt content of the impure electrolyte to less than about 0.1 ppm. Although, the total arsenic requirements will be a function of the degree of impurity of the impure and in particular the cobalt content of the impure, the combined arsenic content of the secondary arsenic source and zinc arsenate should be sufficient to supply about 0.07 to 0.20 grams of arsenic per liter of impure to be treated, and preferably about 0.1 gram of arsenic per liter of impure. The secondary arsenic source may be combined with the zinc arsenate prior to

TABLE XXV

| Trial | Imp.* Co (ppm) | ZnAsO Ave"As" (G.P.L.)* | ZnAsO Produced (Kg) | ZnAsO "As" (Kg) | $As_2O_3$ USED $As_2O_3$ (Kg) | $As_2O_3$ USED "As" (Kg) | Total "As" (Kg) | Total Zinc 1st Stage (Kg) | G.P.L. "As" Per B* | G.P.L. "Zinc" Per B | IMP. Cu ppm | Moles As/ppm Co/liter |
|---|---|---|---|---|---|---|---|---|---|---|---|---|
| 1  | 28 | 31.4 | 186 | 266 | — | — | 266 | 13,290 | 0.102 | 5.08 | 850 | 4.86 |
| 2  | — | 28.9 | 171 | 196 | — | — | 196 | 10,236 | 0.080 | 4.18 | — | 3.81 |
| 3  | — | 28.9 | 198 | 326 | — | — | 326 | 14,810 | 0.105 | 4.77 | — | 5.00 |
| 4  | 33 | 25.0 | — | 229 | 24 | 18.2 | 247 | 13,867 | 0.089 | 4.99 | 925 | 3.60 |
| 5  | 35 | 23.5 | 238 | 256 | — | — | 256 | 11,892 | 0.098 | 4.55 | 1045 | 3.74 |
| 6  | 40 | 24.3 | 294 | 97 | 436 | 330 | 427 | 14,587 | 0.137 | 4.68 | 915 | 4.57 |
| 7  | 40 | 25.4 | 312 | 362 | 52 | 39 | 401 | 16,598 | 0.153 | 6.35 | 980 | 5.11 |
| 8  | 46 | 0 | 360 | 0 | 507 | 384 | 384 | 13,156 | 0.138 | 4.73 | 1010 | 4.01 |
| 9  | — | 30.1 | 240/223 | 262 | 243 | 184 | 446 | 12,438 | 0.160 | 4.48 | — | 4.64 |
| 10 | — | 29.9 | 349 | 271 | 213 | 161 | 432 | 13,777 | 0.139 | 4.44 | — | 4.03 |
| 11 | — | 30.3 | 282/347 | 228 | 182 | 138 | 366 | 12,376 | 0.132 | 4.45 | — | 3.83 |
| 12 | — | 0 | 287 | 0 | 587 | 444 | 444 | 13,446 | 0.159 | 4.84 | — | 4.61 |
| 13 | 41 | 43.7 | 287 | 382 | 218 | 165 | 547 | 13,713 | 0.186 | 4.66 | 1150 | 6.06 |
| 14 | 44 | 42.9 | 270 | 328 | 283 | 214 | 542 | 13,533 | 0.174 | 4.36 | 1215 | 5.28 |
| 15 | 41 | 0 | 359/387 | 0 | 400 | 303 | 303 | 8,774 | 0.154 | 4.47 | 1245 | 5.01 |
| 16 | — | 0 | 377 | 0 | 568 | 430 | 430 | 13,115 | 0.164 | | — | 5.34 |
| 17 | — | 50.2 | 275 | 321 | 173 | 131 | 452 | 14,321 | 0.154 | | 1155 | 5.01 |
| 18 | 40 | 46.3 | 378/300 | 218 | 210 | 159 | 377 | 13,660 | 0.128 | | — | 4.27 |
| 19 | 39 | 50.4 | 343/280 | 357 | 0 | 0 | 357 | 13,724 | 0.121 | | | 4.14 |
| 20 | 35 | 45.4 | 334 | 276 | 0 | 0 | 276 | 13,478 | 0.106 | | | 4.04 |
| 21 | 34 | 50.6 | 345 | 412 | 0 | 0 | 412 | 16,115 | 0.126 | | | 4.95 |
| 22 | 34 | 44.2 | 320/298 | 386 | 0 | 0 | 386 | 15,987 | 0.112 | | | 4.40 |
| 23 | — | 0 | 240/228 | 0 | 477 | 361 | 361 | 17,453 | 0.105 | | | 4.12 |
| 24 | — | 50.6 | 282 | 129 | 264 | 200 | 329 | 15,380 | 0.100 | | | 3.93 |
| 25 | 31 | 45.5 | 250/205 | 356 | 0 | 0 | 356 | 16,206 | 0.108 | | | 4.65 |
| 26 | 28 | 37.4 | 229 | 325 | 6 | 4.5 | 330 | 15,376 | 0.101 | | | 4.82 |
| 27 | 28 | 34.6 | 357/285 | 310 | 15 | 11 | 321 | 15,916 | 0.103 | | | 4.91 |
| 28 | — | 32.6 | 296/276 | 16 | 372 | 282 | 298 | 15,920 | 0.091 | | | |
| 29 | 28 | 31.4 | 186 | 266 | 0 | 0 | 266 | 13,290 | 0.102 | 5.08 | 850 | |
| 30 | | 28.9 | 171 | 196 | 0 | 0 | 196 | 10,236 | 0.080 | 4.18 | | |
| 31 | — | 28.9 | 198 | 326 | 0 | 0 | 326 | 14,810 | 0.105 | 4.77 | | |
| 32 | 33 | 25.0 | | 229 | 24 | 18.2 | 247 | 13,867 | 0.089 | 4.99 | 925 | |
| 33 | 35 | 23.5 | 238 | 256 | 0 | 0 | 256 | 11,892 | 0.098 | 4.55 | 1045 | |
| 34 | 40 | 24.3 | 294 | 97 | 436 | 330 | 427 | 14,537 | 0.137 | 4.68 | 915 | |
| 35 | 40 | 25.4 | 312 | 362 | 52 | 39 | 401 | 16,598 | 0.153 | 6.35 | 980 | |
| 36 | 46 | 0 | 360 | 0 | 507 | 384 | 384 | 13,156 | 0.138 | 4.73 | 1010 | |
| 37 | | 30.1 | 240/223 | 262 | 243 | 184 | 446 | 12,438 | 0.160 | 4.48 | | |
| 38 | — | 29.9 | 349 | 271 | 213 | 161 | 432 | 13,777 | 0.139 | 4.44 | | |
| 39 | | 30.3 | 282/342 | 228 | 182 | 138 | 366 | 12,376 | 0.132 | 4.45 | | |
| 40 | — | — | 287 | 0 | 587 | 444 | 444 | 13,466 | 0.159 | 4.84 | | |
| 41 | 41 | 43.7 | 287 | 382 | 218 | 165 | 547 | 13,713 | 0.186 | 4.66 | 1150 | |
| 42 | 44 | 42.9 | 270 | 328 | 283 | 214 | 542 | 13,553 | 0.174 | 4.36 | 1215 | |
| 43 | — | — | 359/347 | 0 | 400 | 303 | 303 | 8,774 | 0.154 | 4.47 | | |

*G.P.L. is grams per liter,
*"Imp." refers to impure electrolyte.
*B refers to a batch of impure electrolyte which is about 163 m³ of impure.

As is apparent from Table XXV in some cases the total amount of arsenic precipitated from the caustic leach filtrate as zinc arsenate may be insufficient to provide the total amount of arsenic necessary for the addition to the impure. Thus, for example, the arsenic trioxide and zinc arsenate may be slurried in water or dissolved in acid and water before addition to the impure electrolyte.

In almost all instances the total arsenic requirements, or the great majority of the arsenic requirements of the first stage electrolytic purification step are provided by zinc arsenate obtained by recycling the arsenic from the caustic leach filtrate. Thus, the process of this invention greatly increases the economics of the zinc electrolyte purification process by greatly reducing the amount of arsenic containing reagents, such as arsenic trioxide which must be purchased from outside sources.

Although specific embodiments of the process of this invention have been described in detail herein, it is to be understood that changes and/or additions may be made without departing from the spirit and scope of this invention.

We claim:

1. A process for purifying impure zinc electrolyte containing copper, cadmium, and cobalt impurities, to provide zinc electrolyte suitable for electrolytic deposition processes comprising treating impure zinc electrolyte with zinc dust and arsenic wherein all of said arsenic is provided by zinc arsenate or a portion of the arsenic is provided by zinc arsenate and a portion of the arsenic is provided by a second arsenic source; to provide jarosite leaching with an alternative source of sodium ions and to provide a cement copper cake precipitate containing substantially all of the copper, and a filtrate comprising purified electrolyte solution suitable for electrolytic deposition; wherein said zinc arsenate is obtained by:
(a) subjecting said copper containing precipitate to an acid leach to provide an acid leach filtrate and an acid leach residue;
(b) subjecting said acid leach residue to a caustic leach to provide a copper enriched residue and a caustic leach filtrate;
(c) treating said caustic leach filtrate with zinc to provide a residue containing said zinc arsenate.

2. The process according to claim 1 wherein said zinc employed in accordance with step (c) is obtained from spent zinc electrolyte or zinc neutral.

3. The process according to claim 2, wherein said zinc is obtained from zinc neutral and wherein said caustic leach filtrate is treated with said zinc neutral by:
(a) adjusting the temperature of said caustic leach filtrate to about 70°–90° C.; and
(b) adjusting the pH of said caustic leach filtrate to about 5.0–9.0; and
(c) adding zinc neutral to said caustic leach filtrate and maintaining the pH at about 4.0 to 5.0 to precipitate said zinc arsenate.

4. The process according to claim 3, wherein prior to the addition of said zinc neutral, said caustic leach filtrate is adjusted to pH 8.0 and 70° C. and, wherein upon the addition of said zinc neutral the pH is maintained at about 4.8, and wherein said zinc neutral is added in sufficient amount so as to provide about a mole or more of zinc per mole of arsenic in said caustic leach filtrate.

5. The process according to claim 2, wherein said zinc is obtained from spent zinc electrolyte and wherein said caustic leach filtrate is treated by:
(a) adjusting the temperature of said caustic leach filtrate to from about 60°–90° C., followed by
(b) the addition of spent zinc electrolyte, while maintaining the pH at about 4.0 to 5.0 to provide a zinc arsenate containing residue and a filtrate.

6. The process according to claim 5, wherein prior to the addition of the spent electrolyte the temperature of the caustic leach filtrate is adjusted to about 70° C. and wherein upon addition of said spent to said caustic leach filtrate the pH is maintained at about 4.8 to precipitate said zinc arsenate.

7. The process according to claim 2 wherein said impure electrolyte is treated with a sufficient amount of said zinc arsenate and zinc dust to provide a cement copper cake containing substantially all of the copper from the impure electrolyte, and to provide a filtrate comprising purified electrolyte having a cobalt content of less than about 0.1 ppm.

8. The process according to claim 7, wherein said impure electrolyte is treated at about 90°–95° C., with about 4 to 8 pounds of zinc arsenate per ppm cobalt per 163.4 m$^3$ of impure electrolyte and wherein a sufficient amount of zinc dust is added to provide required reduction media.

9. The process according to claim 8, wherein said zinc arsenate is added to said impure electrolyte as a slurry of said zinc arsenate in water.

10. The process according to claim 8, wherein said zinc arsenate is placed in solution and wherein said impure electrolyte is heated with said zinc arsenate solution at about pH 3.0.

11. The process according to claim 10, wherein said zinc arsenate solution comprises a solution of said zinc arsenate in water and acid.

12. The process according to claims 3 or 5, wherein said filtrate provided subsequent to the precipitation of said zinc arsenate is recycled to an electrolytic zinc plant for further utilization at jarosite leaching as a substitute for sodium carbonate.

13. The process according to claim 2, further including the step of treating said acid leach filtrate to reduce the cobalt content thereof, and recycling said treated acid leach filtrate for recovery of zinc and cadmium.

14. The process according to claim 13, wherein said acid leach filtrate treatment comprises treating said filtrate at about 95° C. with potassium permanganate and then adjusting said mixture to a pH of about 3.0 to 3.5, to provide a filtrate of reduced cobalt content.

15. The process according to claim 2, wherein said acid leach step is accomplished by treating said cement copper cake with acid at about 95° C. followed by neutralization to a pH of 3.5 to 4.0.

16. The process according to claim 2, wherein said caustic leach is accomplished by leaching said acid leach residue in a caustic solution at about 95° C., and aerating said mixture, followed by separation of an arsenic containing caustic leach filtrate, and a copper enriched residue.

17. The process according to claim 2, wherein said arsenic employed to treat said impure electrolyte is provided in part by zinc arsenate and in part by a second arsenic source.

18. The process according to claim 17, wherein said second arsenic source is arsenic trioxide.

19. The process according to claim 18, wherein said impure electrolyte is treated with zinc dust and said zinc arsenate and arsenic trioxide to provide a cement copper containing substantially all of the copper from said impure electrolyte, and to provide a filtrate comprising purified electrolyte having a cobalt content of less than about 0.1 ppm.

20. The process according to claim 19, wherein said impure electrolyte is treated at about 90°–95° C. with said zinc dust and arsenic, wherein said zinc arsenate and arsenic trioxide are added in sufficient amounts to provide about 0.07 to 0.2 grams of arsenic per liter of impure electrolyte.

21. The process according to claim 20, wherein said zinc arsenic and arsenic trioxide are added to the impure electrolyte as a slurry of said zinc arsenate and arsenic trioxide in water.

22. The process according to claim 20, wherein said zinc arsenate and arsenic trioxide are placed in solution and wherein said impure electrolyte is treated with said solution at about pH 3.0.

23. The process according to claim 2, wherein to provide said cement copper cake and purified electrolyte:
(a) said impure electrolyte is treated with acid and a stoichiometric amount of zinc dust to precipitate substantially all of the copper as cement copper cake; followed by
(b) separating said cement copper cake from said electrolyte filtrate; followed by
(c) treating said electrolyte filtrate with acid and additional zinc dust, and an amount of arsenic sufficient to precipitate a major portion of the cobalt from the electrolyte, wherein said arsenic is provided by zinc arsenate, or said arsenic is provided in part by zinc arsenate and in part by a second arsenic source; followed by
(d) one or more additional treatments of said electrolyte with acid and zinc dust until the cobalt level in said electrolyte is less than about 0.1 ppm; followed by
(e) separating said precipitated cobalt from said purified electrolyte.

24. The process according to claim 23, wherein in step (a) thereof, said zinc dust addition is carried out at about 80° C., and wherein a sufficient amount of acid is added to the mixture so as to maintain the pH at about 3.0.

25. The process according to claim 24, wherein said zinc dust has a mesh size of less than about +72 Tyler mesh.

26. The process according to claim 24, wherein said zinc dust is added to said electrolyte in amounts sufficient to maintain the reduction-oxidation potential of the electrolyte in the range of from about +200 mv to about −600 mv.

27. The process according to claim 23, wherein in step (c) thereof, the pH of said electrolyte filtrate is adjusted to about 3.0 to 4.5 and a sufficient amount of zinc dust is added to provide the required reducing medium in said electrolyte filtrate; and wherein a sufficient amount of arsenic is added to precipitate a major portion of the cobalt.

28. The process according to claim 27, wherein said arsenic is provided by zinc arsenate.

29. The process according to claim 27, wherein said arsenic is provided in part by zinc arsenate and in part by arsenic trioxide.

30. The process according to claim 23, wherein in step (d), the electrolyte is first treated with zinc dust and acid at about pH 3.5 to 4.5, wherein a sufficient amount of zinc dust is added so as to reduce the cobalt content to less than about 1 ppm; and wherein said electrolyte containing about 1 ppm cobalt is subjected to a second treatment with zinc dust and acid at about pH 4.0 to 4.5 until the cobalt content of said electrolyte is less than about 0.1 ppm.

31. The process according to claim 23, wherein said zinc arsenate is obtained by treating said caustic leach filtrate with spent zinc electrolyte to provide a precipitate containing substantially all of the arsenic from said caustic leach filtrate as zinc arsenate.

32. The process according to claim 23, wherein said zinc arsenate is obtained by treating said caustic leach filtrate with zinc neutral to provide a precipitate containing substantially all of the arsenic from said caustic leach filtrate as zinc arsenate.

33. The process according to claim 32, wherein said zinc arsenate is obtained from said caustic leach filtrate by:
(a) adjusting the temperature of said caustic leach filtrate to about 70° C. and the pH to about 8.0; followed by
(b) the addition of zinc neutral while maintaining the pH of said mixture at about 4.8, wherein a sufficient amount of said zinc neutral is added so as to provide about one or more moles of zinc per mole of arsenic contained in said caustic leach filtrate and to precipitate said zinc arsenate.

34. The process according to claim 31, wherein said zinc arsenate is obtained from said caustic leach filtrate by;
(a) adjusting the temperature of said caustic leach filtrate to about 70° C.; followed by
(b) the addition spent zinc electrolyte while maintaining the pH of said mixture at about 4.8, and wherein a sufficient amount of said spent electrolyte is added so as to provide about one or more moles of zinc per mole of arsenic in said caustic leach filtrate.

35. The process according to claim 23 wherein said arsenic is provided in part by zinc arsenate and in part by arsenic trioxide.

36. The process according to claim 1, wherein said zinc arsenate is obtained by treating said caustic leach filtrate with spent zinc electrolyte to provide a precipitate containing substantially all of the arsenic from said caustic leach filtrate as zinc arsenate.

37. The process according to claim 1, wherein said zinc arsenate is obtained by treating said caustic leach filtrate with zinc neutral to provide a precipitate containing substantially all of the arsenic from said caustic leach filtrate as zinc arsenate.

38. The process according to claim 2, wherein said arsenic is provided in part by zinc arsenate and in part by arsenic trioxide; wherein the total amount of arsenic provided by zinc arsenate and arsenic trioxide comprises about 0.1 gram of arsenic per liter of impure electrolyte.

39. A process for the recovery of arsenic from cement copper cake comprising the steps of:
(a) subjecting said cement copper cake to an acid leach to provide an acid leach residue, and an acid leach filtrate; followed by
(b) subjecting said residue to a caustic leach to provide a copper enriched residue, and a caustic leach filtrate; followed by
(c) treating said caustic leach filtrate with zinc to provide a zinc arsenate containing residue.

40. The process according to claim 39, wherein in step (c) thereof said zinc is obtained from spent zinc electrolyte or zinc neutral.

41. The process according to claim 40, wherein said zinc is provided by zinc neutral and wherein said caustic leach filtrate is treated with said zinc neutral by:

(a) adjusting the temperature of said caustic leach filtrate to about 70°–90° C.; and
(b) adjusting the pH of said caustic leach filtrate to about 5.0–9.0; followed by
(c) adding zinc neutral to said caustic leach filtrate and maintaining the pH at about 4.0 to 5.0 to provide a precipitate containing substantially all of the arsenic from the caustic leach filtrate as zinc arsenate.

42. The process according to claim 41, wherein prior to the addition of said zinc neutral, said caustic leach filtrate is adjusted to pH 8.0 and 70° C. and wherein upon the addition of said zinc neutral the pH is maintained at about 4.8, and wherein said zinc neutral is added in sufficient amount so as to provide about a mole or more of zinc per mole of arsenic in said caustic leach filtrate.

43. The process according to claim 40, wherein said zinc is obtained from spent electrolyte and wherein said caustic leach filtrate is treated by:
(a) adjusting the temperature of said caustic leach filtrate to from about 60°–90° C., followed by
(b) the addition of spent zinc electrolyte, while maintaining the pH at about 4.0 to 5.0 to provide a precipitate containing substantially all of the arsenic from said caustic leach filtrate as zinc arsenate.

44. The process according to claim 43, wherein prior to the addition of the spent electrolyte the temperature of the caustic leach filtrate is adjusted to about 70° C. and wherein upon addition of said spent to said caustic leach filtrate the pH is maintained at about 4.8 to precipitate said zinc arsenate.

45. The process according to claim 39, wherein said zinc is provided by zinc neutral and wherein said caustic leach filtrate is treated with said zinc neutral to provide a precipitate containing substantially all of the arsenic from said caustic leach filtrate as zinc arsenate.

46. The process according to claim 39, wherein said zinc is provided by spent zinc electrolyte and wherein said caustic leach filtrate is treated with said spent electrolyte to provide a precipitate containing substantially all of the arsenic from said caustic leach filtrate as zinc arsenate.

47. The process according to claim 39, wherein said acid leach step is accomplished by treating said cement copper cake with acid at about 95° C., followed by neutralization to a pH of about 3.5 to 4.0.

48. The process according to claim 47, wherein said acid is sulphuric acid and said neutralization is accomplished with sodium hydroxide.

49. The process according to claim 39, wherein said caustic leach is accomplished by leaching said acid leach residue in a caustic solution at about 95° C. while continously aerating said mixture to provide a residue enriched in copper content and a filtrate containing substantially all of the arsenic from said acid leach residue.

50. The process according to claim 49, wherein said caustic solution contains sodium hydroxide and wherein said conditions are maintained for about 6 hours.

51. A process for purifying impure zinc plant electrolyte comprising:
(a) treating said impure electrolyte in a first tank at about 80° C. with sufficient acid to maintain the pH at about 3.0, and a sufficient amount of zinc dust to maintain a redox potential in the range of +200 to −600 mv. and precipitate substantially all of the copper from said electrolyte as cement copper cake, wherein the residence time in said first tank is about 1 hour;
(b) separating said cement copper cake from said residue;
(c) transferring said separated electrolyte to a second tank and adding zinc dust and additional acid to provide a pH of about 3.0 to 4.5, and sufficient amount of zinc arsenate or zinc arsenate and arsenic trioxide to precipitate about 90% of the cobalt from the electrolyte and form a slurry with said electrolyte;
(d) transferring said slurry to a third tank and adding additional acid to maintain a pH of about 3.5 to 4.5 and adding course zinc dust to said slurry to precipitate additional cobalt and reduce the dissolved cobalt level to about 1.0 ppm;
(e) transferring said slurry to a fourth tank and adding acid to provide a pH of about 4.0 to 4.5 and adding zinc dust to said slurry in a sufficient amount to reduce the cobalt level to below about 0.1 ppm; and
(f) separating the precipitated cobalt from said electrolyte.

52. The process according to claim 51, wherein said zinc arsenate is obtained by:
(a) subjecting said cement copper cake to an acid leach to provide an acid leach residue and filtrate;
(b) subjecting said acid leach residue to a caustic leach to provide an enriched copper residue, and an arsenic containing filtrate;
(c) treating said caustic leach filtrate with spent zinc electrolyte or zinc neutral to precipitate substantially all of the arsenic in said caustic leach filtrate as zinc arsenate.

* * * * *